(12) United States Patent
Romand et al.

(10) Patent No.: US 11,950,725 B2
(45) Date of Patent: Apr. 9, 2024

(54) PORTION DISPENSER FOR DISPENSING PORTIONED BEVERAGE ITEMS

(71) Applicant: SOCIETE DES PRODUITS NESTLE S.A., Vevey (CH)

(72) Inventors: Damien Romand, Grenoble (FR); Etienne Crozier, La Neuveville (CH); Marco Magatti, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 123 days.

(21) Appl. No.: 16/956,280

(22) PCT Filed: Dec. 19, 2018

(86) PCT No.: PCT/EP2018/085715
§ 371 (c)(1),
(2) Date: Jun. 19, 2020

(87) PCT Pub. No.: WO2019/121832
PCT Pub. Date: Jun. 27, 2019

(65) Prior Publication Data
US 2021/0076866 A1 Mar. 18, 2021

(30) Foreign Application Priority Data
Dec. 22, 2017 (EP) .................................... 17210546

(51) Int. Cl.
*A47J 31/40* (2006.01)
*B65D 83/04* (2006.01)

(52) U.S. Cl.
CPC ........ *A47J 31/407* (2013.01); *B65D 83/0409* (2013.01)

(58) Field of Classification Search
CPC ................ A47J 31/3642; A47J 31/407; B65D 83/0409; G07F 11/04
(Continued)

(56) References Cited

U.S. PATENT DOCUMENTS 6,240,832 B1 * 6/2001 Schmed .............. A47J 31/3623
    221/121
6,941,855 B2 * 9/2005 Denisart ............. A47J 31/3633
    221/121
(Continued)

FOREIGN PATENT DOCUMENTS

CN  1499948 A  5/2004
CN  102633223 A  8/2012
(Continued)

OTHER PUBLICATIONS

WO2014/127863 (Year: 2023).*
(Continued)

*Primary Examiner* — Nathaniel E Wiehe
*Assistant Examiner* — Frederick F Calvetti
(74) *Attorney, Agent, or Firm* — K&L Gates LLP

(57) ABSTRACT

The invention relates to a portion dispenser (2) for dispensing beverage items (8) from an exchangeable cartridge (3) comprising: a frame (4) with a receiving portion (5) for receiving the exchangeable cartridge, a discharge opening (6) next to the receiving portion (5) and sized for allowing a beverage item to be individually discharged by gravity from the 5 exchangeable cartridge, a moving means assembly (16) comprising a moving means (19) and a moving means housing (20) in which the moving means are arranged for moving therein, wherein the moving means (19) are arranged for providing a discharge chamber (23) for discharge of at least one beverage item therein and for transporting to a dispensing area (17) and wherein the moving means assembly (16) is arranged for sealingly 10 connecting with the exchangeable cartridge (3) and comprises means for opening the exchangeable cartridge to allow the discharge of the beverage item in the discharge chamber and for reclosing the exchangeable cartridge.

14 Claims, 12 Drawing Sheets

(58) Field of Classification Search
USPC .......................................................... 221/265
See application file for complete search history.

(56) References Cited

U.S. PATENT DOCUMENTS

| | | | |
|---|---|---|---|
| 9,907,428 B2* | 3/2018 | Iotti | A47J 31/3642 |
| 2003/0146237 A1 | 8/2003 | Costa | |
| 2005/0061158 A1* | 3/2005 | Della Pietra | A47J 31/3633 |
| | | | 99/279 |
| 2013/0011521 A1* | 1/2013 | Weijers | A47J 31/407 |
| | | | 426/87 |
| 2013/0122153 A1* | 5/2013 | Ferrier | A47J 31/3638 |
| | | | 426/84 |
| 2014/0054326 A1* | 2/2014 | Ophardt | B05B 11/3001 |
| | | | 222/325 |
| 2014/0208951 A1 | 7/2014 | Yui | |
| 2015/0099039 A1* | 4/2015 | Ferrier | A47J 31/3633 |
| | | | 426/77 |
| 2015/0223632 A1* | 8/2015 | Hall | A47J 31/44 |
| | | | 99/295 |
| 2015/0375926 A1* | 12/2015 | Fischer | A47J 31/3642 |
| | | | 99/289 R |
| 2016/0029832 A1* | 2/2016 | Iotti | A47J 31/3642 |
| | | | 221/199 |
| 2016/0109165 A1* | 4/2016 | Mackey | A47J 31/407 |
| | | | 426/524 |
| 2016/0194148 A1* | 7/2016 | Weijers | B65D 85/8052 |
| | | | 426/87 |
| 2018/0325302 A1* | 11/2018 | Gordon | A47J 31/469 |
| 2019/0166886 A1* | 6/2019 | Gordon | A23L 2/54 |
| 2020/0107571 A1* | 4/2020 | Sanna | A24B 3/14 |

FOREIGN PATENT DOCUMENTS

| | | | |
|---|---|---|---|
| CN | 104837384 A | | 8/2015 |
| CN | 105592757 A | | 5/2016 |
| CN | 105916414 A | | 8/2016 |
| CN | 106714631 A | | 5/2017 |
| EP | 1046366 | * | 10/2000 |
| EP | 2554081 | | 2/2013 |
| RU | 2306839 C2 | | 9/2007 |
| RU | 2015149492 A | | 7/2017 |
| WO | 2008113459 A1 | | 9/2008 |
| WO | 2012022878 | | 2/2012 |
| WO | 2014127863 | | 8/2014 |
| WO | 2014135677 | | 9/2014 |

OTHER PUBLICATIONS

EP2554081 (Year: 2023).*
China Patent Office Communication for Application No. 201880082271.2 dated Nov. 17, 2021, 15 pages.
Russia Patent Office Communication for Application No. 2020119060/03(032326), dated Apr. 28, 2022, 20 pages.

* cited by examiner

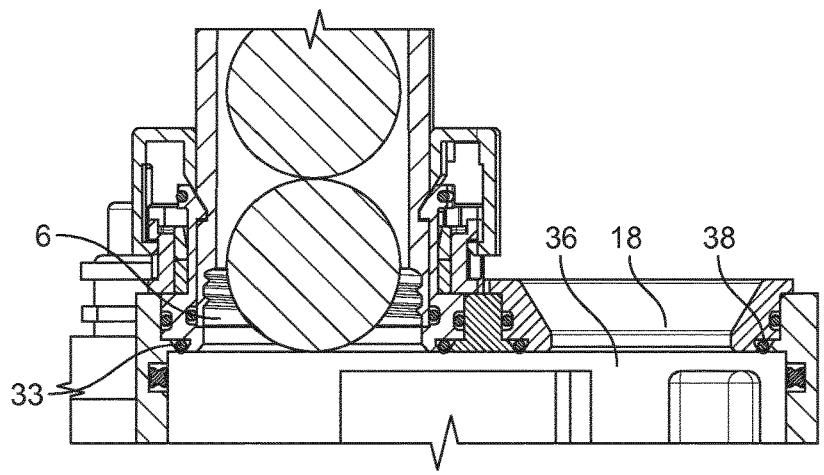
FIG. 13
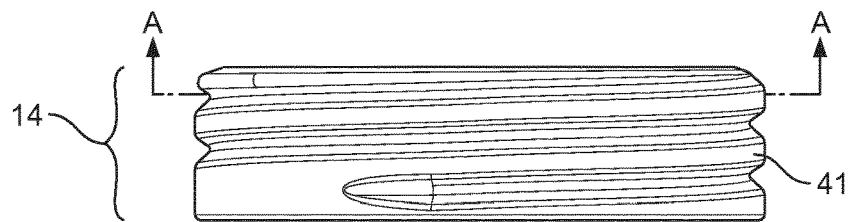
FIG. 14
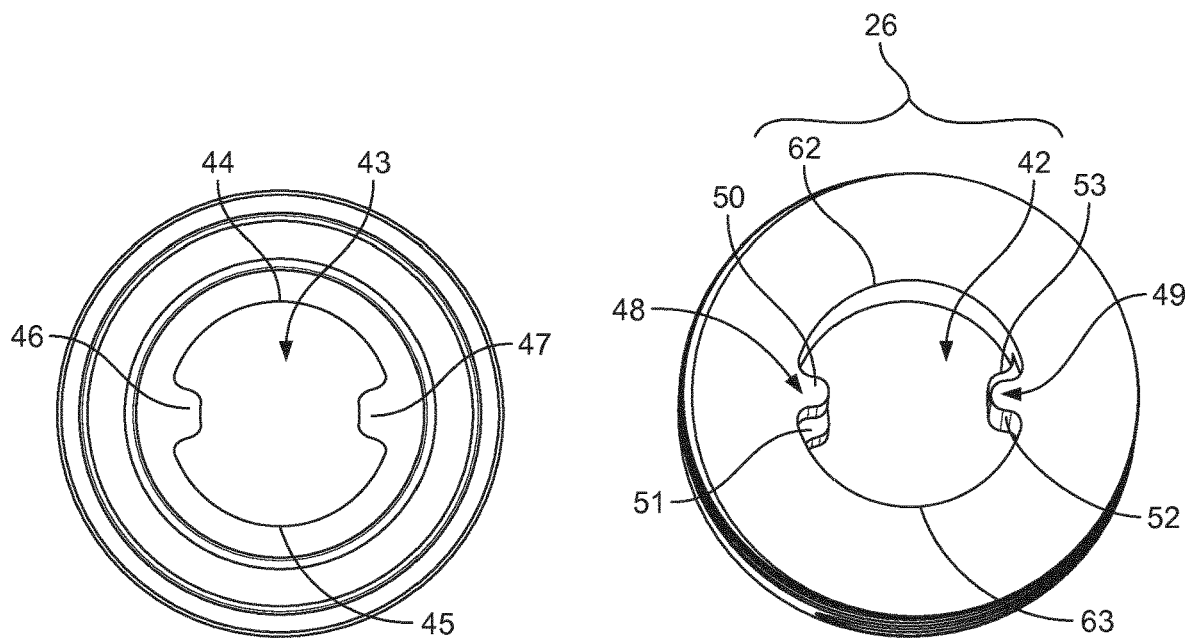
FIG. 15
FIG. 16

PORTION DISPENSER FOR DISPENSING PORTIONED BEVERAGE ITEMS

CROSS REFERENCE TO RELATED APPLICATIONS

The present application is a National Stage of International Application No. PCT/EP2018/085715, filed on Dec. 19, 2018, which claims priority to European Patent Application No. 17210546.2, filed on Dec. 22, 2017, the entire contents of which are being incorporated herein by reference.

FIELD OF THE INVENTION

The invention relates to the storing and dispensing of portioned beverage items for the preparation of beverages using such portioned beverage items in a beverage preparation device such as a coffee machine for in-home or professional use.

BACKGROUND OF THE INVENTION

It is known that coffee is sold in airtight packages to protect it from contact with air that would cause quick oxidation and loss of aromas. The field of beverage sealed capsules has developed tremendously essentially because each coffee portion can be well protected against oxidation by a suitable gastight, functional package until coffee is extracted in a dedicated coffee machine.

For example, EP0512468 and EP0512470 provide respectively a beverage sealed capsule and a process for extracting a beverage from such capsule.

U.S. Pat. Nos. 8,178,139 8,210,097 provide respectively a spherical capsule comprising compacted aggregate of substance to be infused and a packaging envelope impermeable to air and water and a machine for automatically preparing and dispensing a beverage from such sealed capsule by puncturing the packaging envelope. In particular, the capsules are stacked in a reservoir above the infusion chamber and selected individually by a rear yoke forming part of the infusion chamber.

FR2879175 provides a coffee dose for automatic beverage and dispensing machines comprising an infusion chamber and a tamping position for a determined quantity of ground coffee in the infusion chamber. The coffee dose can be compacted from roast and ground coffee to a rolling external shape, a substantially spherical ball. The coffee dose further comprises an envelope of at least one layer or film of porous material imprisoning the coffee aggregate.

In general, the portioned package solutions which are designed to well preserve the coffee ingredient against oxidation provide many advantages such as freshness, coffee quality by perfect dosing and controlled extraction. However, they are expensive to produce, are generally package material consuming and may require a sophisticated packaging recycling chain.

Alternative dosing solutions have been developed for dosing and dispensing beverage ingredient portions which when individually taken are sensitive to oxidation but which are stored as a whole in a container in which the level of oxygen is reduced by a sealing protective packaging and/or by associating to the container dedicated vacuum or protective gas supply means when the container is connected to the dispenser device.

WO2014135677 proposes a device for controlled dispensing of capsules containing beverage ingredients wherein it comprises a discharge outlet for selectively dispensing the capsules and a barrier distribution area arranged within a capsule transport path and means for flushing inert gas in the capsule discharge chamber.

EP1876936 relates to an airtight coffee dispenser including a rigid container provided with a lid and an outlet nozzle closed by a shutter means. The dispenser includes means suitable to dispense from the container the product while reducing the storage volume.

EP1879487 relates to the dispensing of coffee powder from a dispenser including a storage container, shutter means and vacuum or inert gas supply to purge the dispensing chamber from oxygen.

The disadvantages of the existing solutions with a dedicated vacuum or inert gas production device is that it makes the system complex and costly to operate. Additionally, coffee ingredient dispensing solutions especially for coffee powder in bulk pose dosing accuracy problems and are not very clean as powder tends to spread over surfaces of the dispenser and beverage machine.

Therefore, a solution is sought after for providing a low cost, sustainable and simple dispenser device and system to precisely and reliably dispense beverage product ingredient, e.g. roast and ground coffee, for the preparation of beverage while maintaining product ingredient as fresh as possible and reducing packaging material consumption.

The present invention aims at overcoming the above-outlined problem of the prior art. Furthermore, the invention aims at providing a solution to further problems identified in the description.

SUMMARY OF THE INVENTION

The invention relates to a portion dispenser for dispensing portioned beverage items ("beverage items") from an exchangeable cartridge comprising:
  a frame with a receiving portion for receiving the exchangeable cartridge,
  a discharge opening next to the receiving portion and sized for allowing the beverage items to be individually discharged by gravity from the cartridge,
  a moving means assembly comprising moving means and a moving means housing in which the moving means are arranged for moving therein;
  wherein the moving means assembly is arranged for providing a discharge chamber for the discharge of at least one beverage item and for transporting it to a dispensing area,
  wherein the moving means assembly is arranged for connecting with the exchangeable cartridge and comprises means for opening the exchangeable cartridge to allow the discharge of the beverage item in the discharge chamber and for re-closing the exchangeable cartridge.

In particular, the moving means assembly is arranged for sealingly connecting with the exchangeable cartridge and comprises means for opening the exchangeable cartridge to allow the discharge of the beverage item in the discharge chamber and for re-closing the exchangeable cartridge.

The terms "sealingly connecting" refer to a sealed connection arranged for limiting preferably avoiding any significant ingress of ambient air at the connection during opening and re-closing the exchangeable cartridge. It is preferred to have a sealed connection to have/keep the beverage item in an environment protected from ambient such as by vacuum or inert oxygen-free gas.

In particular and in a preferred solution, the moving means are axially arranged relative to the discharge opening and inside the moving means housing to move between an extended position in which the moving means come at or next to the discharge opening to support at least one beverage portion item and a retracted position in which the discharge chamber is defined at least partly by the moving means and moving means housing and as a function of the retraction distance of the moving means relative to the discharge opening to receive at least one, preferably a single beverage item discharged from the cartridge.

In an alternative solution, it is proposed that the moving means are laterally arranged relative to the discharge opening and inside the moving means housing to move between an extended position in which the moving means come at or next to the discharge opening to support at least one beverage portion item and a retracted position in which the discharge chamber is defined at least partly by the moving means and moving means housing and as a function of the retraction distance of the moving means relative to the discharge opening to receive at least one, preferably a single beverage item discharged from the cartridge.

In a further alternative solution, it is proposed that the moving means are arranged in an inclined manner relative to the discharge opening According to a principle of the invention, beverage items can be selectively dispensed from an exchangeable cartridge by the device of the invention while limiting preferably avoiding the exposure of the interior of the cartridge to ambient air. Preferably, in the retracted position of the moving means, the volume of the discharge chamber can be tightly adjusted to the size of the beverage item(s) as function of the stroke of the moving means. In the extended position, the moving means gently take the beverage item(s) in charge and the mechanical constraints (e.g. fall, bumps) on the beverage item(s) are reduced such that the integrity of the beverage item(s) is maintained during dispensing thereby making the device clean and accurate in dosing.

Preferably, the receiving portion of the frame comprises at least one tubular surface arranged for coupling with the exchangeable cartridge in a substantially vertical or inclined arrangement of the exchangeable cartridge allowing discharge of the portioned items by gravity. In particular, the exchangeable cartridge comprises a tubular storage member; at least portion of it is sized to fit or be received in the tubular portion of the receiving portion of the dispenser.

The storage tubular member comprises a removable connection member such as an annular groove arranged for removably connecting the tubular storage member to a connection member such as a hook-type elastically biased connection member of a receiving portion of the dispenser. The removable connection member is preferably positioned in an attachment portion of the storage tubular member that can fit with a complementary tubular surface of the receiving portion. The connection member of the receiving portion can be positioned in the tubular surface.

As "vertical or inclined arrangement" it is meant that the cartridge is oriented with its open end positioned at the lowermost level for allowing discharge of portioned items by gravity therethrough.

Preferably, the receiving portion comprises at least one seal member for providing a substantially gastight and/or moisture tight arrangement between the exchangeable cartridge and the discharge opening when coupled to each other.

Preferably, the receiving portion comprises at least one latch member arranged for removably and resiliently latching the exchangeable cartridge. For example, the latch member(s) can be a resilient hook-type connection member adapted to fit in an annular complementary groove of the tubular storage member of the exchangeable cartridge.

The portion dispenser is particularly suitable to couple with an exchangeable cartridge comprising a tubular storage member which is initially sealed by a closure cap and has an interior protected from ambient such as by vacuum or inert oxygen-free gas. The tubular storage member and closure cap can be formed of packaging material(s) comprising a barrier to oxygen such as EVOH or PVOH or aluminium. In particular, before any first removal of the closure cap, the interior is preferably substantially void of oxygen. The possible level of residual oxygen should be such that it roast and ground coffee is maintained substantially non-oxidized within a period of several days or weeks. Preferably, the moving means have at least one sealing member acting on the moving means housing to prevent or at least reduce the exchange of air between the moving means and the moving means housing. The moving means housing is furthermore sealingly connected to the receiving portion of the frame by at least one seal member.

Therefore, when the exchangeable cartridge is coupled to the dispenser (i.e. receiving portion and moving means) and the discharge chamber is arranged by the retraction of the moving means in the moving means housing to receive the beverage item, there is no significant ingress of air in the cartridge from the exterior of the discharge chamber. The only possible air ingress comes from the volume of the discharge chamber itself when placed in communication with the interior of the cartridge when the moving means are retracted. However, such volume is kept as close as possible to the size of the beverage item(s) to be selectively discharged.

Preferably, the piston comprises a terminal portion arranged for connecting to a closure cap removably attached to the tubular storage member of the cartridge so that the piston moves between the retracted position and the extended position with the closure cap connected thereto. Therefore, the volume available for the beverage item in the discharge chamber can be delimited partially by the closure cap borne by the piston in the retracted position of the piston. Preferably, the closure cap is arranged to support the beverage item against gravity, i.e., substantially horizontally (i.e. lower than 20 degrees relative to horizontal).

The invention essentially stems from the principle that the gas and/or moisture exchange can be minimized between beverage items stored in group in the package and the ambient air while selectively dispensing the beverage item(s). One aspect lies on the ability to repeatedly, securely and automatically open for dispensing and re-sealing the cartridge by the portioned product dispenser.

The opening and re-closing means comprise a keying member with a terminal portion arranged for complementarily fitting with a locking member of the closure cap to be removed from the tubular member of the cartridge.

The removal of the closure cap can be performed at higher speed and can be properly controlled by the portion dispenser to ensure the opening of the cartridge for dispensing or a beverage item in the receiving housing forming a sealed confined area of the portion dispenser (e.g., in a limited volume in which the portioned item is trapped before for transfer to the dispensing area) and so where the potential volume of oxygen capable of entering the cartridge remains sufficiently low. Furthermore, the risk of accidental or inappropriate removal of the closure cap is avoided.

Preferably, the moving means move between the retracted position and the extended position with the closure cap connected thereto. The closure cap is preferably sized to fit, e.g. slide, in the moving means housing so as to define the discharge chamber with the moving means housing as the moving means retract. The beverage item can thus be supported by the closure cap which is itself connected to the moving means.

The closure cap may have at least one seal member arranged to seal within the moving means housing. This may be necessary, for example, if no sealing member is provided between the moving means and the moving means housing.

In a further aspect, the moving means assembly is mounted to the frame in a moveable manner so as to move the discharge chamber between a discharge position in which the moving means are situated in axial relationship with the discharge opening and a dispensing position in which the moving means are situated in axial relationship with a dispense opening of the frame.

The moving means assembly is mounted to be moved to the dispensing area in a direction which preferably differs from the direction of the moving means between its extended and retracted position in the moving means housing. The moving means assembly is preferably moved by a moving means assembly actuator connected to the frame.

Therefore, the transport of the selected beverage item(s) is managed by moving the moving means assembly while the discharge chamber is maintained by the retraction of the moving means in the moving means housing.

In one mode, the discharge opening and the dispensing opening may both be arranged in parallel axial relationship so as to provide a simple movement of the moving means housing, e.g. a pivotal movement, relative to the frame between the two positions.

Additionally, the moving means housing comprises or is associated to a shutter arranged for sealingly closing the discharge opening as the moving means housing moves the moving means to the dispensing area. The shutter is preferably a portion of wall transversally arranged relative to the discharge opening and to the dispensing opening and arranged for moving together with the moving means housing between the discharge opening and the dispensing opening for selectively shutting off the discharge opening or the dispensing opening as soon as the moving means housing is displaced out of the discharge opening or the dispensing opening. Preferably, the shutter is fixedly attached to or integral with the moving means housing.

In particular, at least one sealing member may be provided on the receiving portion of the frame for sealingly pressing against the shutter or vice versa. Therefore, as the beverage item is transported, the interior of the exchangeable cartridge remains separated from the ambient air. For example, when a reduced air content is present in the cartridge, such reduced air content is maintained unchanged even during dispensing of the beverage item by the moving means.

The opening and re-closing means further comprise a moving means actuator arranged for driving the moving means in a reciprocal axial path, most preferably a combined axial and rotational path between the retracted position and the extended position.

Preferably, the moving means actuator comprises a spindle-type driving member linked directly or via a gear mechanism to a motor. The advantage lies in the possibility to manage efficient handling of the cap in opening and re-closure by the dispensing of the beverage item at high speed (i.e., when removing it for discharging a beverage item and when re-connecting it for resealing the cartridge).

For loading the discharge chamber with the beverage item, the moving means are preferably axially arranged relative to the discharge opening and inside the moving means housing to be moved by the moving means actuator between the retracted position in which the discharge chamber receives the beverage item discharged from the cartridge and the extended position in which the discharge chamber is filled at least in part by the moving means, preferably by a single beverage item.

In a preferred embodiment, the moving means are in the form of a circular piston. However, other moving means, like oval piston, ball or blade may be considered.

In a preferred mode, the moving means are moved axially and rotationally along their longitudinal axis simultaneously (e.g. in guidance with an helical path of a thread provided on the piston) by the moving means actuator to unscrew the closure cap from the tubular member of the exchangeable cartridge and for re-screw the closure cap thereafter.

Preferably, the moving means assembly is mounted in a rotatable manner relative to the frame.

In a first mode, the moving means assembly is mounted rotatable relative to the frame along an axis parallel to the discharge opening axis and/or to the dispensing opening axis. In particular, the moving means housing pivot relative to a substantially vertical axis in the frame. In this case, the dispensing opening is preferably positioned on a top wall of the frame.

In a second mode, the moving means assembly is mounted rotatable relative to frame along an axis perpendicular to the discharge opening axis and/or to the dispensing opening axis. The moving means housing may have a cylinder shape which rotates, e.g. about a substantially horizontal axis, in a frame comprising a complementary cylindrical guiding cavity. In this case, the shutter may be formed as a part of the cylindrical surface of the moving means housing which when the latter rotates closes the discharge opening and/or dispensing opening. The discharge opening can be positioned at an angular position relative to the dispensing opening. Such angular position of the discharge opening may be comprised between 20 and 180 degrees, preferably between 45 and 120 degrees relative to the axis of the dispensing opening.

Preferably, a moving means assembly actuator is provided to move the moving means assembly between the beverage item discharge position and the beverage item dispensing position. The moving means assembly actuator is further arranged to drive the moving means housing, the moving means and the moving means actuator as a full assembly. Such moving means assembly actuator preferably comprise an electrical motor linked to the moving means housing directly of via a rotating gear mechanism that may be lodged for example in the frame of the dispenser. As the shutter is preferably an extension part of the moving means housing, it can be moved together with the moving means housing without requiring an additional motor. This simplifies greatly the construction of the dispenser and ensures a reliable closure of the discharge and dispensing openings.

The invention also relates to a portion dispenser for beverage items from an exchangeable cartridge comprising:
- a frame with a receiving portion for receiving the exchangeable cartridge,
- a discharge opening next to the receiving portion and sized for allowing the beverage items to be individually discharged by gravity from the cartridge,
- a moving means assembly comprising moving means and a moving means housing in which the moving means are arranged for moving therein;

wherein the moving means assembly is arranged for providing a discharge chamber for the discharge of at least one beverage item and for transporting it to a dispensing area, wherein the moving means assembly is arranged for sealingly connecting with the exchangeable cartridge and comprises means for opening the exchangeable cartridge to allow the discharge of the beverage item in the discharge chamber and, wherein the device further comprises means for actuating the moving means assembly between a discharge position in which the moving means are situated in axial relationship with the discharge opening and a dispense position in which the moving means are situated in axial relationship with a dispense opening of the frame.

The moving means are preferably arranged to be actuated by a moving means actuator between a retracted position and an extended position as described earlier.

The moving means assembly is actuated by a moving means assembly actuator as described earlier. The moving means assembly actuator is arranged for moving the moving means assembly between the two positions when the moving means are in a retracted position in the housing.

The coordination of the moving means actuators and of the moving means assembly actuator is controlled by a control unit which can be part of the dispenser or be associated therewith.

The opening means of the moving means assembly are also preferably means for re-closing the exchangeable cartridge.

The opening means preferably can comprise a terminal portion of the moving means for removably coupling to a closure cap of the exchangeable cartridge. The moving means can also be actuated by a moving means actuator for removing the closure cap from the cartridge and for re-placing it in sealing position with the cartridge. Preferably, the moving means are actuated by a spindle-type driving member for unscrewing and re-screwing the closure cap. More preferably, a keying member of the moving means are provided that is arranged for removably coupling with a locking member of the closure cap (or vice versa).

The invention further relates to a portion dispenser system comprising a portion dispenser as aforementioned and at least one exchangeable cartridge.

The exchangeable cartridge may comprise:
a tubular storage member comprising an interior for accommodating a plurality of portioned beverage ingredient items (also referred as "beverage items") comprising a closed end and an open end comprising an exit opening having a size preferably configured for allowing the dispensing of a single beverage item at a time, wherein the tubular storage member comprises an attachment portion at or next to the discharge opening and connectable to at least one tubular portion of the receiving portion and,
a closure cap adapted to connect to the tubular storage member at the open end of the storage member in a removable and sealable manner through a removable complementary connection of the tubular storage member and closure cap.

The closure cap of the cartridge may comprise a locking member arranged for complementarily fitting with a keying member of the portion dispenser and for allowing the closure cap to be removed from the tubular member and to be re-connected to the tubular member. The keying member of the dispenser can be provided at a terminal portion of the moving means so allowing their engagement when the moving means are in its extended position in the moving means housing.

The interior of the cartridge is preferably protected from ambient such as by vacuum or inert oxygen-free gas and the tubular storage member and closure cap are sealingly closed in such a manner to prevent exchange of gas with ambient when the closure cap is in sealed connected position with the tubular storage member. The tubular member and closure cap can be formed of packaging material(s) comprising a barrier to oxygen such as EVOH or PVOH.

The beverage items are preferably spherical. The beverage items are preferably essentially made of compacted powder, flakes, fibers or a combination thereof, more preferably are compacted balls made of or comprising essentially roast and ground coffee.

The invention further relates to a beverage preparation device comprising a portion dispenser or portion dispenser system as aforementioned.

BRIEF DESCRIPTION OF THE DRAWINGS

FIG. 5 shows a cross-sectional perspective view of the portioned dispenser system in the discharge position with the moving means in extended position and the exchangeable cartridge sealed by its closure cap (i.e., before the selection and loading of a beverage item from the pile in the dispenser);

FIG. 6 shows a cross-sectional perspective view of the portioned dispenser system of the invention of FIG. 1 in the discharging position with a beverage item arranged in the discharge chamber before transfer to the dispensing area;

FIG. 7 shows a cross-sectional perspective view of the portioned dispenser system of the invention with a beverage item arranged in the discharge chamber with the moving means in retracted position and after transfer in the dispensing position;

FIG. 8 shows a perspective view of the portioned dispenser system of the invention in the dispensing position with the moving means in the extended position and a beverage item being dispensed in the dispensing area;

FIG. 13 is an enlarged cross-section view of FIG. 12;

FIG. 14 shows a side view of the closure cap of the exchangeable cartridge;

FIG. 15 is a bottom view of the closure cap of FIG. 14;

FIG. 16 is a perspective cross-section view along A-A of the closure cap of FIG. 14;

DETAILED DESCRIPTION OF THE PREFERRED EMBODIMENTS

Figure 1:
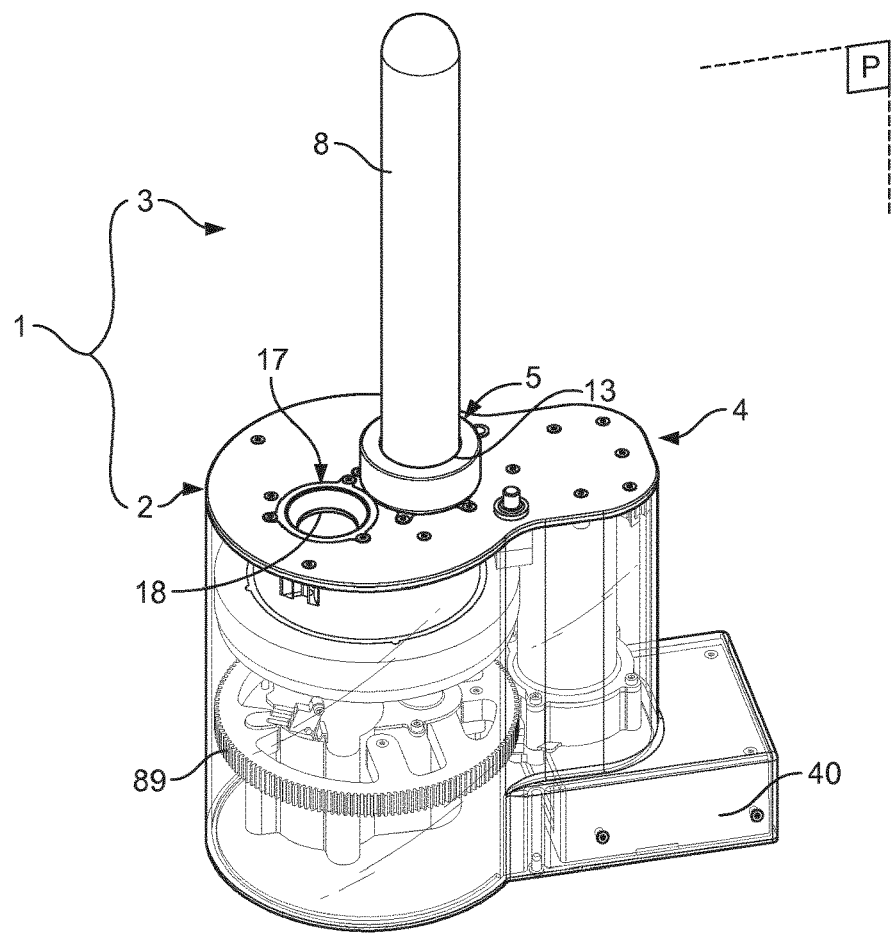
FIG. 1 shows a perspective view of the portioned dispenser system of the invention with an exchangeable cartridge assembled with the portion dispenser.
Figure 3:
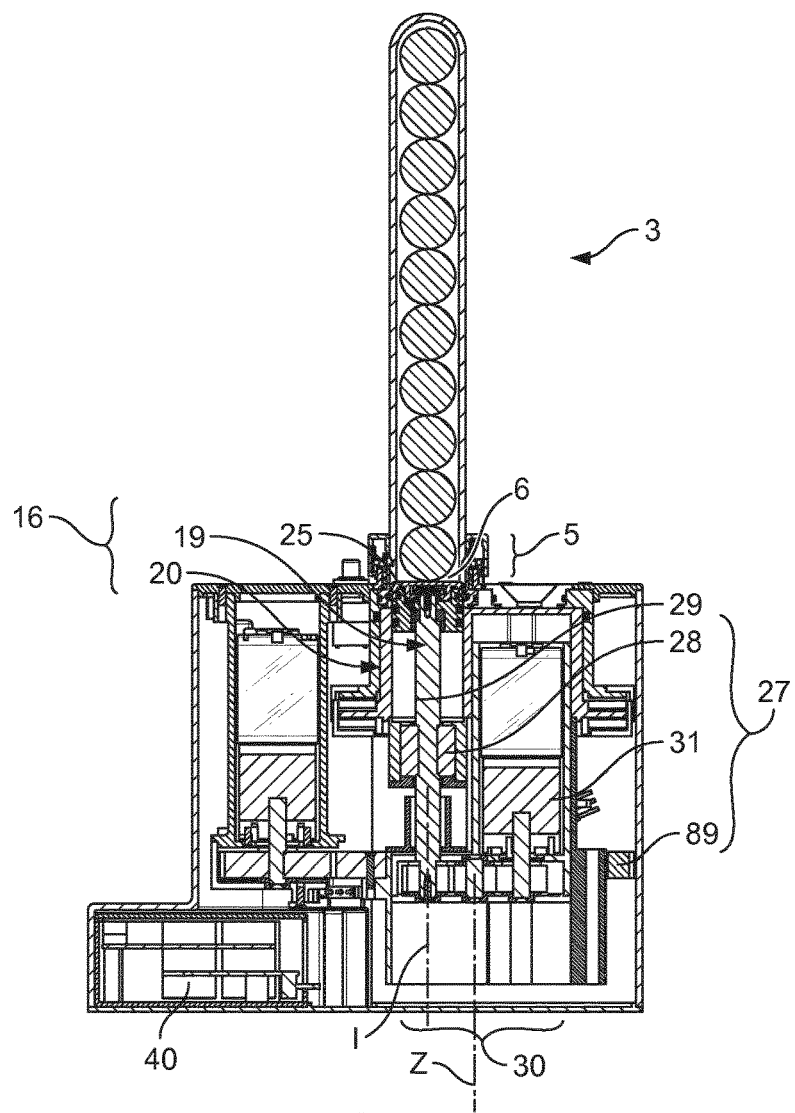
FIG. 3 shows a cross-section plane view in plane P of the portioned dispenser system of the invention of FIG. 1.
Figure 4:
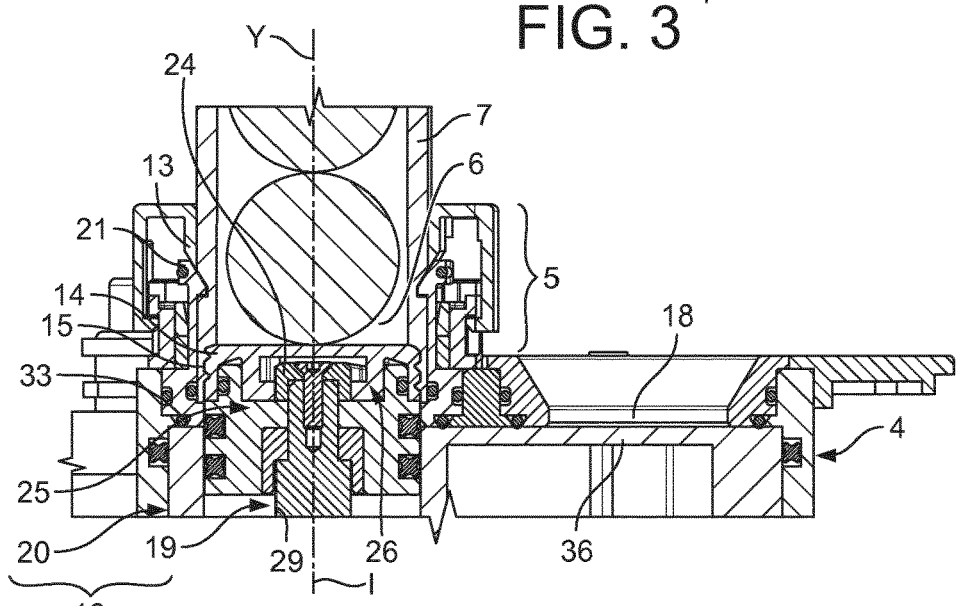
FIG. 4 is an enlarged view of FIG. 3 showing the interface between the exchangeable cartridge and the portion dispenser in the extended position of the moving means.

The invention relates to a portioned dispenser system 1 as illustrated in FIGS. 1, 3 and 4 comprising a portion dispenser 2 and an exchangeable cartridge 3.

The portion dispenser 2 generally comprises a frame 4 having a receiving portion 5 for receiving the exchangeable cartridge. A discharge opening 6 may be provided in the receiving portion.

Figure 2:
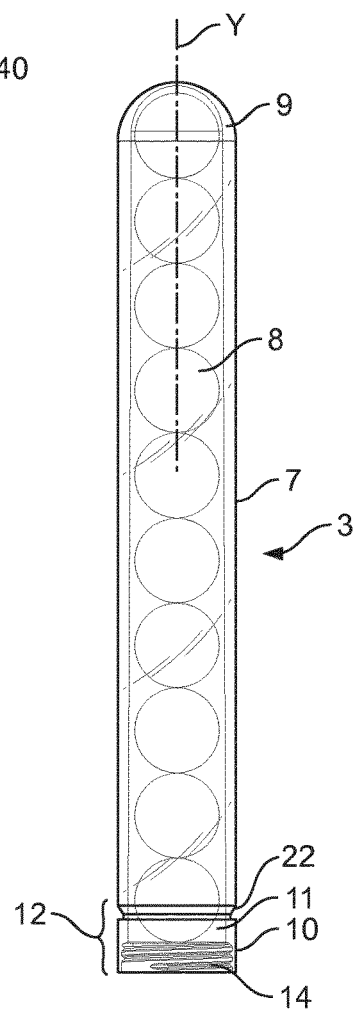
FIG. 2 shows a side view of an exchangeable cartridge of the invention.

As illustrated in FIG. 2, the exchangeable cartridge 3 comprises a tubular storage member 7 for storing beverage items 8 such as compacted balls of beverage ingredients. The beverage ingredients can comprise or be roast and ground coffee. The tubular storage member is preferably arranged to accommodate a pile of beverage items that when the exchangeable cartridge is received in the receiving portion 5 is arranged vertically thereby allowing the beverage item to be discharged individually and by gravity in the portion dispenser. The tubular storage member is preferably elongated and extends along a longitudinal axis (Y). In particular, the storage tubular member comprises a closed end 9 and an open end 10 comprising an exit opening 11 having a size configured for allowing the dispensing of a single beverage item at a time. The tubular storage member 7 comprises an attachment portion 12 at or next to the exit opening 11 and connectable to at least one tubular surface 13 of the receiving portion 5 of the frame. Furthermore, a closure cap 14 is adapted to connect in a removable and sealable manner to the tubular storage member 7 at its open end 10. For this, a removable complementary connection 15 of the storage member and closure cap is provided. As will be discussed in more detail later, this removable connection can advantageously comprise a threading for enabling the closure cap to be removed by unscrewing it and be connected by screwing.

Preferably, the interior of the exchangeable cartridge has low oxygen content. More preferably, it is under vacuum or is saturated with protective gas such as carbon dioxide and/or nitrogen. The tubular storage member and the closure cap are preferably made of polymer and/or metal materials which are barrier to oxygen at least during several days or weeks. A gas and moisture sealing arrangement is also arranged between the protective cap 14 and the tubular storage member 7 such as by a gas sealing connection and/or by additional at least one seal member, e.g. a sealing lip or O-ring.

According to an aspect of the invention, the portion dispenser comprises a moving means assembly in the form of a piston assembly 16 arranged for receiving a beverage item and transporting it to a dispensing area 17 of the frame that comprises a dispensing opening 18. The piston assembly essentially comprises moving means in the form of a piston 19 reciprocally arranged in a moving means housing in the form of a piston housing 20. The piston is axially arranged with the discharge opening 6 and aligned with the longitudinal axis of the exchangeable cartridge when fitting in the receiving portion of the portion dispenser.

The tubular surface 13 of the dispenser is arranged for coupling with the tubular member 7 of the exchangeable cartridge such that the cartridge is held in a substantial vertical arrangement thereby allowing the discharge of the beverage items by gravity in the dispenser. The receiving portion 5 may further comprise at least one latch member 21 arranged for removably engaging the tubular storage member of the exchangeable cartridge. As illustrated in FIG. 4, the latch member may be an elastically biased hook-type member positioned inside the tubular surface 13 resiliently arranged for engaging a complementary recess such as an annular complementary-shaped groove 22 of the storage member. The hook-type latch member 21 may comprise at least one tooth with a substantially transversal surface engaged with the groove 22 to prevent upward axial movement of the cartridge. This connection enables to secure the exchangeable cartridge in place, prevents accidental removal during operation and may further contribute to the sealing of the exchangeable cartridge with the receiving portion and to the stable alignment with the piston assembly. Of course, these latch means may take many other forms such as a spring-biased ring or a series of circumferentially distributed spring-biased beads. For example, the male part (e.g. hook-type member) may also be part of the cartridge and the female part (e.g. groove) may be provided inside the tubular surface 13.

Figure 9:
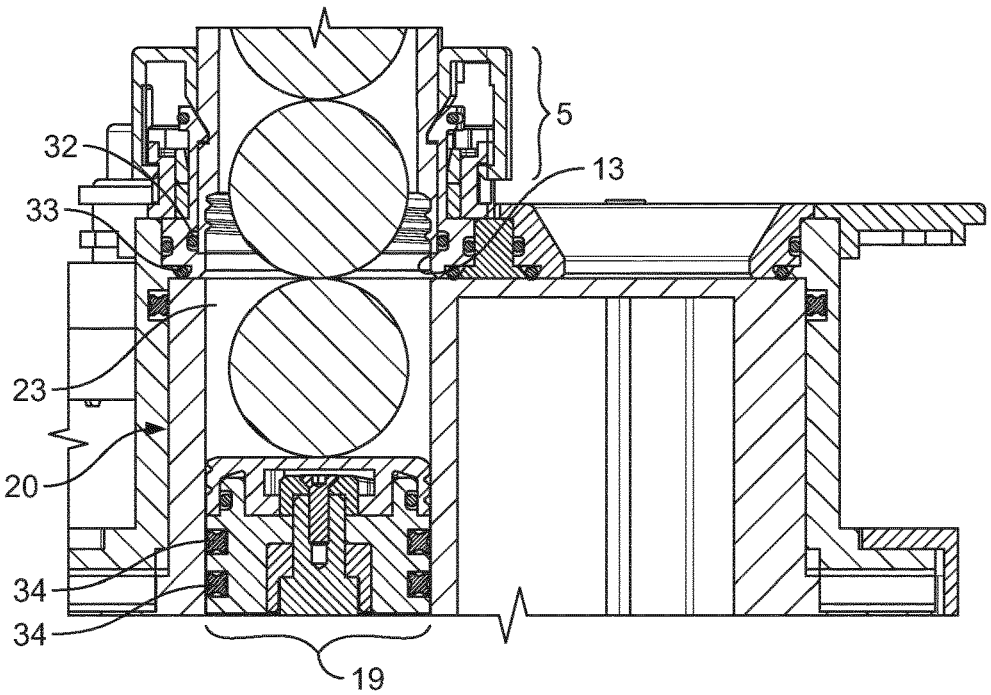
FIG. 9 is an enlarged cross-section view of FIG. 5.

The piston 19 is arranged in the piston housing 20 of the piston assembly 16 to move between an extended position in which the piston comes next to the discharge opening 6 (visible in FIGS. 3 and 4) and a retracted position in which a discharge chamber 23 is defined (visible in FIG. 9). The volume of the discharge chamber 23 is defined as a function of the retraction distance of the piston relative to the discharge opening 6. Such distance may be adjusted to the number and/or volume of beverage items to be discharged such that a minimal empty volume is formed in the discharge chamber 23 when the beverage item(s) is (are) present. In particular, such volume may be dimensioned to a single beverage item to enable the individual capture of the beverage item by the piston assembly.

The piston assembly 16 further comprises means for opening and re-closing the exchangeable cartridge to control the individual discharge of the beverage item while maintaining a low oxygen content in the interior of the cartridge. For this, the piston comprises a terminal portion 24 arranged for connecting to the closure cap 14 of the exchangeable cartridge. The piston assembly 16 is arranged for moving the piston in such a manner to detach the removable complementary connection 15 and re-connect it after dispensing of the beverage item.

In particular, the terminal portion 24 of the piston forms part of a keying member 25 arranged for complementary fitting with a locking member 26 of the closure cap. This keying and locking arrangement will be further described in relation to the example of FIGS. 15-21. As a matter of principle, the keying and locking members 25, 26 are configured to provide a connection enabling the closure cap to remain fixed to the piston when the latter moves between the extended position and the retracted position. As a result, the closure cap forms a support for the first beverage item of the pile when the piston is retracted thereby causing the first beverage item to be discharged gently in the discharge chamber accompanied by the piston when the latter is retracted instead of falling in the chamber by gravity. This support during discharge provides the advantage to maintain the integrity of the beverage item such that a proper individual dosing is made possible by the piston assembly.

The opening and re-closing means further comprise a moving means actuator in the form of a piston actuator 27 arranged for driving the piston in a reciprocal and axial path in the piston housing. Furthermore, the piston actuator 27 is arranged for providing a combined axial and rotation motion along its longitudinal axis (I) to the piston enabling the closure cap attached to the piston to be removed (e.g. unscrewed) from the storage tubular member of the cartridge. For this, the combined axial and rotational motion is arranged to match the threaded path of the complementary connection 15 of the closure cap in the cartridge. The piston actuator 27 may be a spindle-type driving member which comprises a spindle nut member 28 fixed to the piston housing which engages with a threaded spindle 29 of the piston so as to move the piston reciprocally along an axial and rotational path of axis (I) between the extended and retracted positions. The spindle 29 is driven by a gear mechanism 30, that may be formed of two (or more) pinions, driven by an electrical motor 31. Advantageously, the gear mechanism is arranged such that the electrical motor is positioned parallel to the piston in order to save space in the frame of the dispenser. It should be noted that the gear mechanism can be omitted and the motor can be aligned with the spindle 29 with a direct link to it.

As represented on FIG. 9, the portion dispenser comprises sealing members arranged for providing an effective gas-tight and moisture-tight seal arrangement with the exchangeable cartridge when such is engaged in the receiving portion 5. In particular, a sealing member 32 is provided between the receiving portion 5 and the tubular storage member 7 of the cartridge. The sealing member 32 can be part of or added to the tubular surface 13, for example, to an inner lower part of it. The sealing member 32 may alternatively or additionally be part of the tubular storage member 7. Another sealing member 33 is provided between the receiving portion 5 of the frame or other close part of it and the piston housing 20.

Again the sealing member 33 can be part of the receiving portion as illustrated or additionally or alternatively part of the piston housing. At least one other sealing member 34 (actually two sealing members represented in the preferred example) is part of the piston 19 and positioned to engage with the piston housing 20. The sealing members 32, 33 and 34 participate to the sealing connection of the exchangeable cartridge with the piston assembly such that substantially no air coming from outside can possibly enter in the discharge chamber 23 and in the interior of the exchangeable cartridge. The results is that when the closure cap is removed by the piston being retracted, the pressure balance and gas transfer resulting therefrom is only possible between the exchangeable cartridge and the discharge chamber 23. There is substantially no air drawn by the piston retraction coming from outside.

According to another aspect of the portion dispenser, the piston assembly 16 is mounted in the frame 4 to be moveable between the discharge position and a dispensing position. In the illustrated mode, the piston assembly is mounted in a pivotable manner about an axis of rotation Z which is parallel to the axis I of motion of the piston. In the dispensing position, the piston becomes positioned in axial relationship with the dispensing opening 18 (along axis O). The discharge opening 6 and the dispensing opening 18 may both be arranged in parallel axial relationship (essentially vertically) so as to provide a simple movement of the piston assembly, e.g. a pivotal movement, relative to the frame between the two positions. The motion of the piston assembly is driven by a moving means assembly actuator in the form of a piston assembly actuator 35. The piston assembly actuator may comprise a circumferential pinion 89 fixed to the piston housing, a driving pinion 60 geared to the circumferential pinion and an electrical motor 38.

The piston assembly further comprises a shutter 36 for sealingly closing the discharge opening 6 as the piston is moved to the dispensing area. The shutter is preferably a portion of wall transversally arranged relative to the discharge opening 6 and to the dispensing opening 18. The shutter is arranged for moving together with the piston housing 20 between the discharge opening and the dispensing opening for selectively shutting off the discharge opening or the dispensing opening as soon as the piston housing is displaced out of the discharge opening or the dispensing opening. In the preferred mode, the shutter 36 forms an extension wall of the piston housing that extends transversally to the axis I and 0 of the openings.

Figure 11:
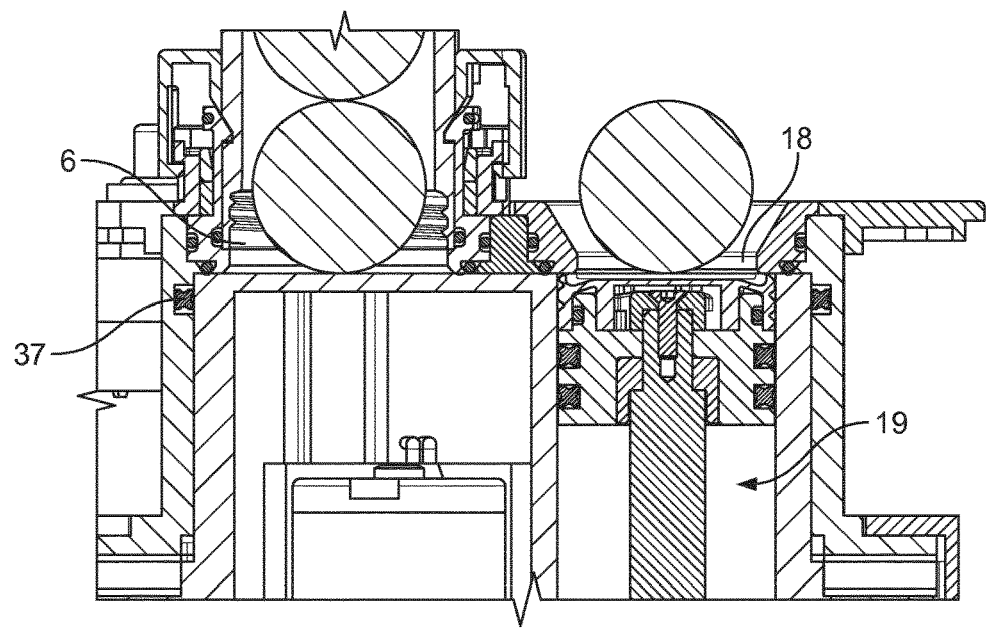
FIG. 11 is an enlarged cross-section view of FIG. 7.
Figure 12:
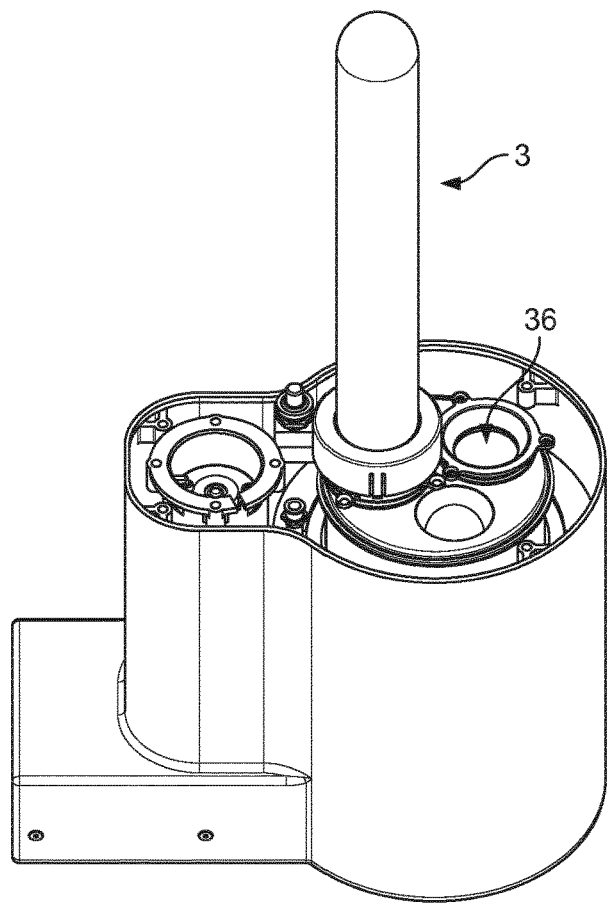
FIG. 12 shows a perspective view of the portioned dispenser system with the frame partly removed in an intermediate position of the moving means assembly between the discharge and dispensing positions.
Figure 17:
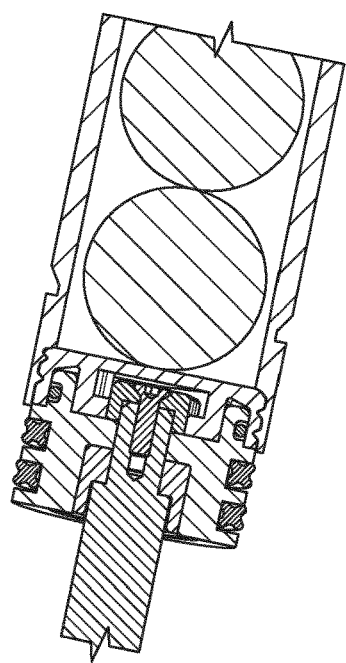
FIG. 17 is a cross-sectional side view of the engagement of the keying member of the moving means and the locking member of the closure cap of the exchangeable cartridge.
Figure 18:
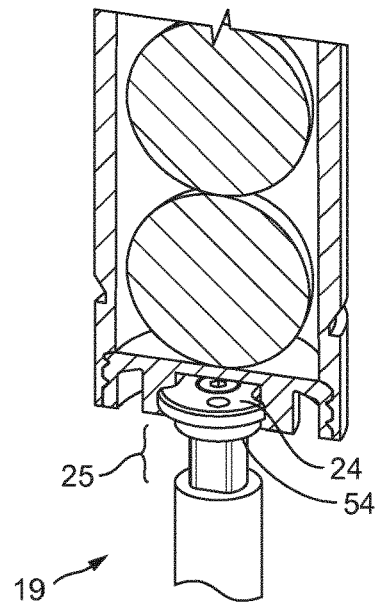
FIG. 18 is a perspective cross-sectional view of the FIG. 17 with the sealing part of the moving means removed.

The support surface of the closure cap (i.e. the surface supporting the beverage item for dispensing it through the housing as shown in FIG. 11) is also designed to match the surface of the shutter so that the amount of air that can enter in the cartridge is kept as low as possible. Preferably, the support surface of the closure cap is planar when the shutter is planar.

Figure 10:
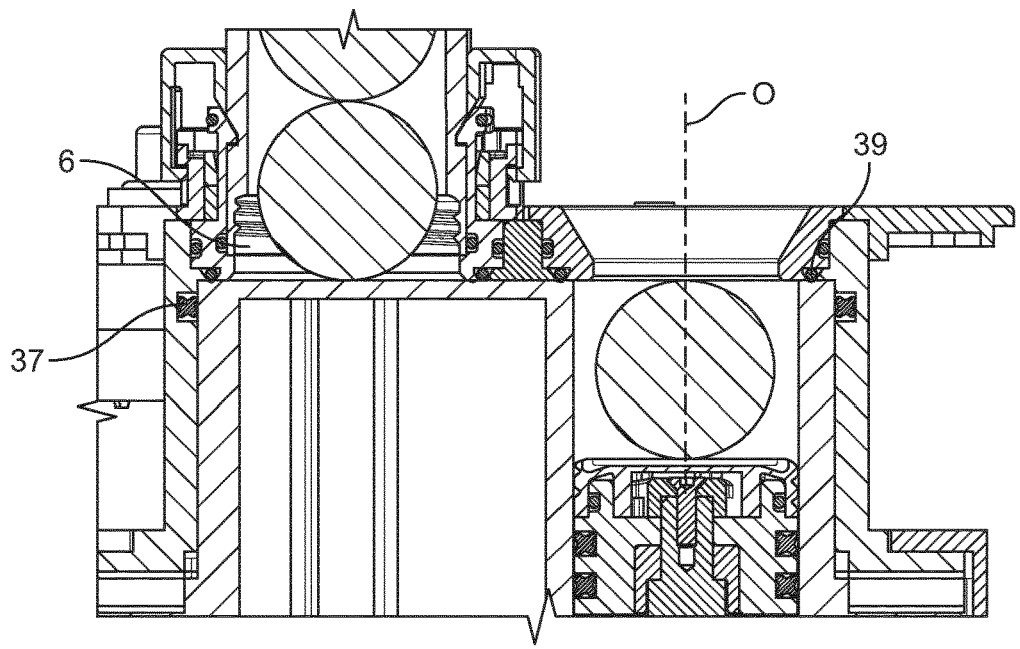
FIG. 10 is an enlarged cross-section view of FIG. 6.

Additional sealing members are provided to further secure the gas and/or moisture tightness of the piston housing. In particular, at least one sealing member 37 can be positioned between the piston housing 20 and the frame 4. The sealing member 37 ensures the tightness of the piston chamber during the rotation of the piston housing 20. Also, at least one sealing member 38 can be positioned between the dispensing opening 18 and the piston assembly. In this case, the sealing member can bear on the wall of the shutter 36 when the dispensing opening is closed, i.e. when the piston housing is not yet aligned with the dispensing opening (FIGS. 9, 11). It also presses on the edge 39 of the piston housing when the piston is aligned with the opening axis O (FIG. 10).

The piston actuator 27 and piston assembly actuator 35 can be automatically controlled by a control unit 40 housed in the frame or in a different part of the dispenser. The control unit is configured to command the actuators in a synchronous manner to provide a correct operation including respectively: the discharge of a beverage item, its dispensing to the dispensing area and the return of the piston assembly to its initial position for a next cycle.

The operation of the portion dispenser can be described in relation to FIGS. 5 to 8.

To start the dispensation cycle of a beverage item, an exchangeable cartridge 3 is connected to the portion dispenser in the receiving portion with its closure cap 14 connected in closure to the tubular storage portion 7. The exchangeable cartridge is locked in the receiving portion 5 by the elastic connection member. The connection can be simply secured by manually pushing the cartridge down towards the dispenser. The elastic connection member is biased until it fits in the annular groove 22 by elastic return.

In this configuration, the interior of the cartridge remains under vacuum or under protected atmosphere. The beverage items are stacked in the cartridge with the lowermost beverage item pressing on the closure cap. The piston assembly lies in an initial position with the piston being in extended position to receive the exchangeable cartridge. In this case, a position sensor may be provided that detects the presence of the exchangeable cartridge and actuate the extension of the piston by the piston actuator accordingly.

Figure 5:
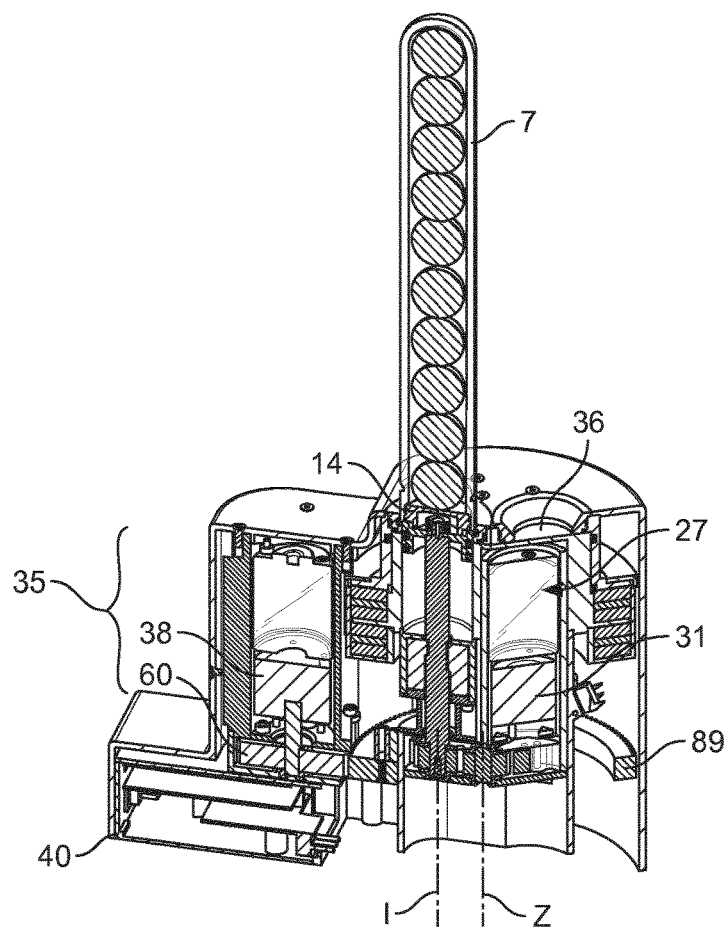
FIGS. 5 to 8 illustrate in perspective cross-sectional views the principle of kinematic of the portion dispenser according to a first embodiment.

In the position of FIG. 5, the keying member 25 of the piston is engaged in the locking member the closure cap. The engagement may start with a simply axial insertion of the keying member in the locking member as will be further discussed in relation to FIGS. 17 and 18.

Figure 6:
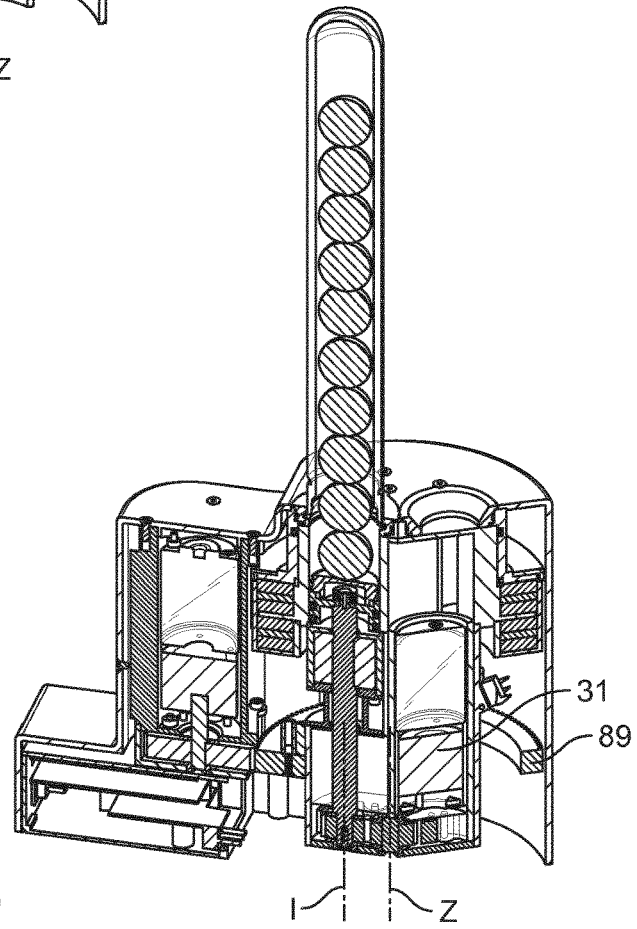

In the next step illustrated in FIG. 6, the piston is actuated in the retraction position. The control unit 40 commands the piston actuator 27 accordingly and the piston is moved downwards in a combined axial and rotational motion. At the start of such motion, the keying member 25 of the terminal portion of the piston locks up automatically in the locking member of the closure cap thereby ensuring the axial connection of the two. This locking is obtained by the combined movement of the keying member 25 while the locking member remains stationary as will be explained further in detail in relation to FIGS. 14 to 21. As the piston is retracted along the spindle, the keying member applies a combined rotational and axial force in the locking member to remove, e.g. unscrew, the closure cap 14 from the tubular storage member of the cartridge. As the piston retracts, the closure cap is entrained and lowers down with a beverage item supported thereon. The beverage items is received in the discharge chamber 23 formed by the retracted piston and piston housing.

Figure 7:
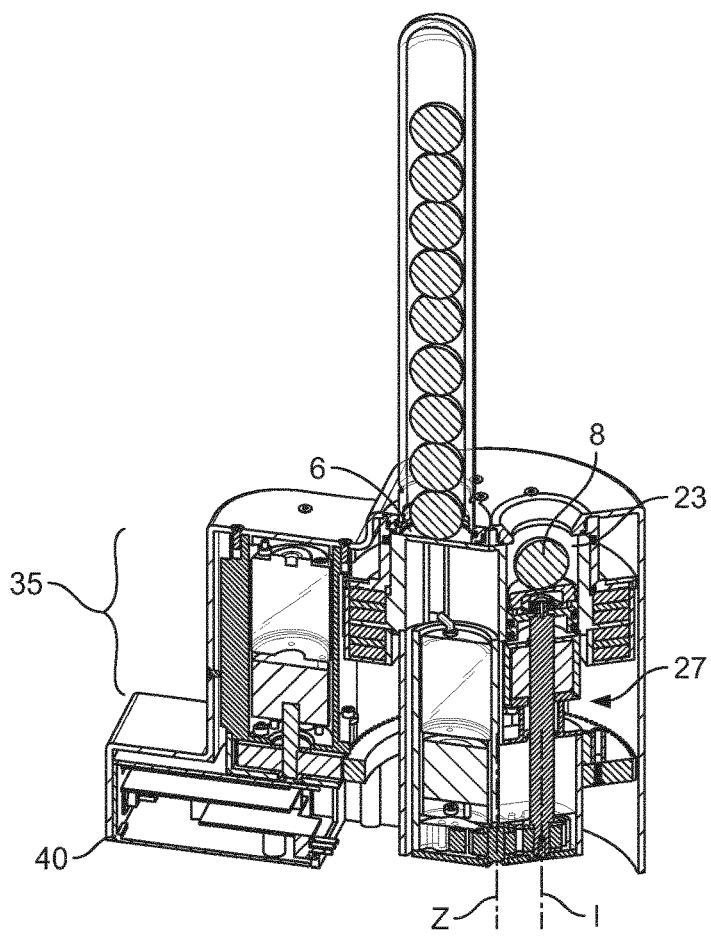

In the next step illustrated in FIG. 7, the piston assembly 16 is actuated in rotation thereby transporting the selected beverage item 8 in the discharge chamber 23 accordingly. The control unit commands the piston assembly actuator 35 accordingly while the piston remains in the retracted position during this stage. The discharge opening 6 is shut off by the shutter 36 sliding transversally as soon as the piston moves away from the discharge opening. As the shutter moves to the shutting-off arrangement of the discharge opening, a sealing arrangement is obtained between the shutter and the receiving portion by seal 33 (as illustrated in FIG. 13). As a result, the exposure of the interior of the cartridge to the ambient is essentially prevented. In this mode, the support surface of the closure cap is designed with a radius of curvature that is substantially the same as the radius of the shutter surface of the piston housing so that the amount of air that can enter in the cartridge is kept as low as possible.

Figure 8:
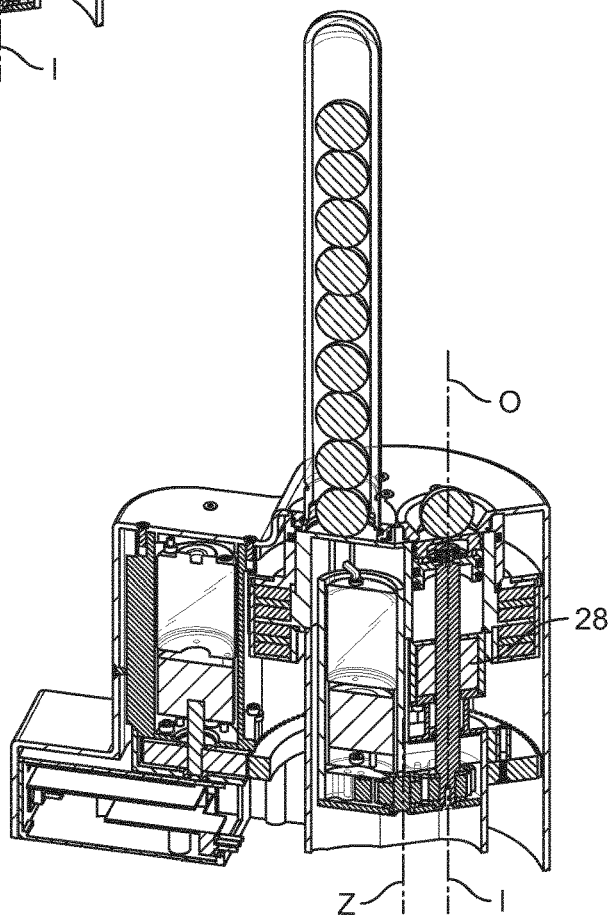

In the next step illustrated in FIG. 8, the piston is actuated in the extended position. The control unit commands the piston actuator accordingly and the piston is moved upwards along the spindle up to a point where the beverage item lies in the dispensing area, e.g., extends beyond or through the dispensing opening. It should be noted that the dispensing area may be a beverage brewing area or a handling area.

In the next step, the piston assembly is returned to the initial position for a new cycle.

FIGS. 14 to 21 provides one possible example of a keying and locking arrangement according to the invention. However, many other variants are possible. In this example, the closure cap 14 comprises a thread portion 41 as part of the removable complementary connection. A complementary thread portion is provided in the tubular storage member. It should be noted that the connection could be any other equivalent connection means such as a bayonet-type connection or equivalent. The locking member 26 of the closure cap comprises a hollow portion 42 for the terminal portion 24 of the keying member. The locking member further comprises an entry passage 43 communicating with the receiving cavity. The entry passage has a smaller cross-section than the receiving cavity. The entry passage is arranged with a shape similar but slightly larger than the shape of the terminal portion in such a manner that the terminal portion can be inserted through the entry passage in a privilege rotational orientation illustrated in FIGS. 17 and 18. For instance, the entry passage has substantially two opposed arc-shaped portions 44, 45 interrupted by a pair of opposed protrusion surfaces 46, 47 extending towards the center of the passage. The hollow portion 42 has essentially two opposed arc-shaped annular portions 62, 63 interrupted by a pair of stepped protrusions 48, 49. Each stepped protrusion is formed by an innermost protrusion portion 50 and an outermost protrusion portion 51 of substantially similar shape but which are slightly radially offset one another. In a plane view, the contour of the stepped protrusions is essentially covered by the opposed protrusion surfaces 46, 47 of the entry passage. Each protrusion is arranged in the cavity to form respectively first and second radial abutment surfaces 52, 53 for the terminal portion of the closure cap by the piston.

Figure 19:
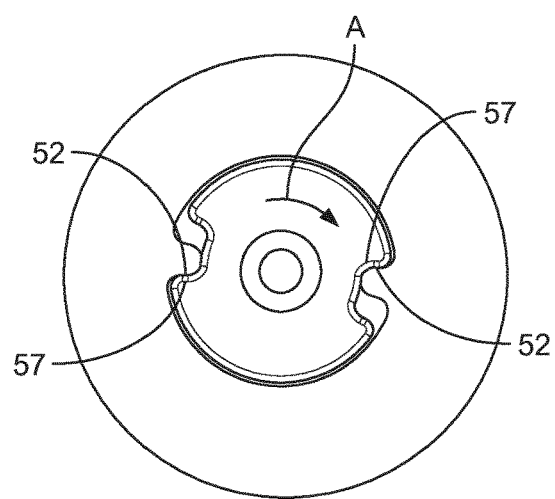
FIG. 19 is a perspective cross-section view along A-A of the closure cap showing the engagement of the keying member during removal, i.e. unscrewing of the closure cap by the moving means.
Figure 20:
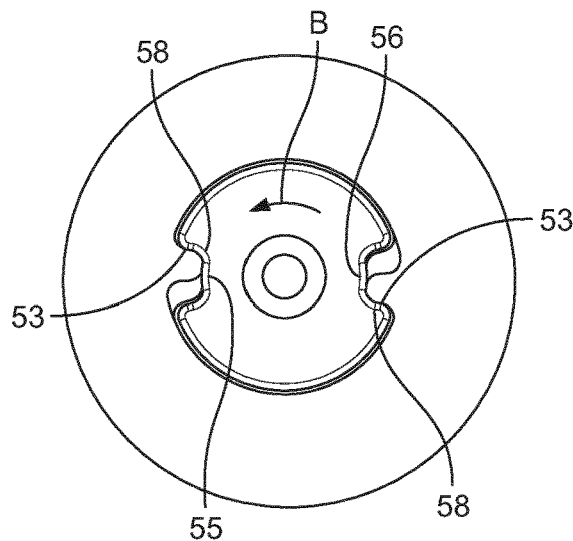
FIG. 20 is a perspective cross-section view along A-A of the closure cap showing the engagement of the keying member during re-connection, i.e. screwing of the closure cap by the moving means.
Figure 21:
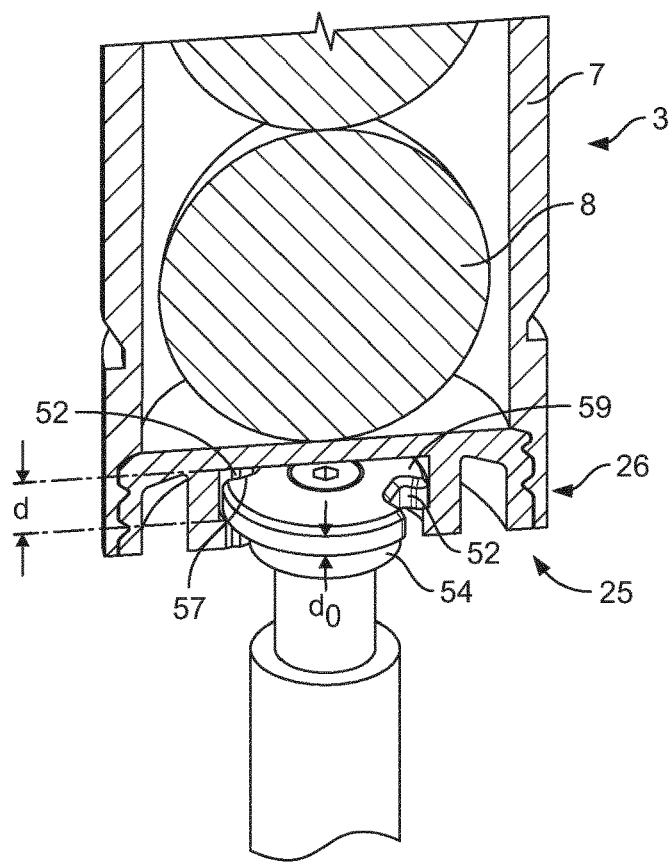
FIG. 21 is a perspective cross-sectional view of FIG. 20.

On the keying member 25 of the piston, the terminal portion 24 forms an enlarged surface substantially matching the shape of the entry passage. The terminal portion connects outwardly by a reduced surface 54 narrower than the entry passage so as to not hinder with it during rotation of the keying member. The terminal portion of the keying member comprises a pair of opposed recesses 55, 56 configured for allowing passage of the terminal portion through the entry passage. Each recess comprises a first radial abutment surface 57 adapted to be engaged by the first abutment surface 52 of the locking member and a second radial abutment surface 58 adapted to be engaged by the second abutment surface 53 of the locking member. As shown in FIG. 19, the first abutment surfaces 52, 57 of the members abut with each other when the keying member unscrews the locking member (in rotational direction A) to remove the closure cap from the exchangeable cartridge. As shown in FIG. 20, the second abutment surfaces 53, 58 abut with each other when the keying member screws the locking member (in rotational direction B) to re-close the closure cap to the exchangeable cartridge. In FIG. 21, it is possible to view the abutment surfaces 52 of the keying member when forcing against the abutment surfaces 57 of the locking member during the unscrewing operation of the closure cap. It should be further noticed that the depth "d" of the receiving cavity 42 is much larger than the thickness "do" of the terminal portion with a sufficient gap 59 to prevent blocking of the keying member with the locking member during operation.

Of course, many variations of shape are possible for the keying and locking arrangement provided a secured locking between the piston and the closure cap is obtained which enable a reliable removal and re-closing of the closure cap and the accommodation of a beverage item in the discharge chamber for transfer to the dispensing area.

A second embodiment of the dispenser system of the invention is illustrated in relation to FIGS. 22 to 27. For convenience, the same numeral references are used to designate the same technical means as for the first embodiment of FIGS. 1 to 21. The description concerning such characteristics is applicable to this embodiment and will not be repeated here. Only the main differences are essentially discussed.

Figure 27:
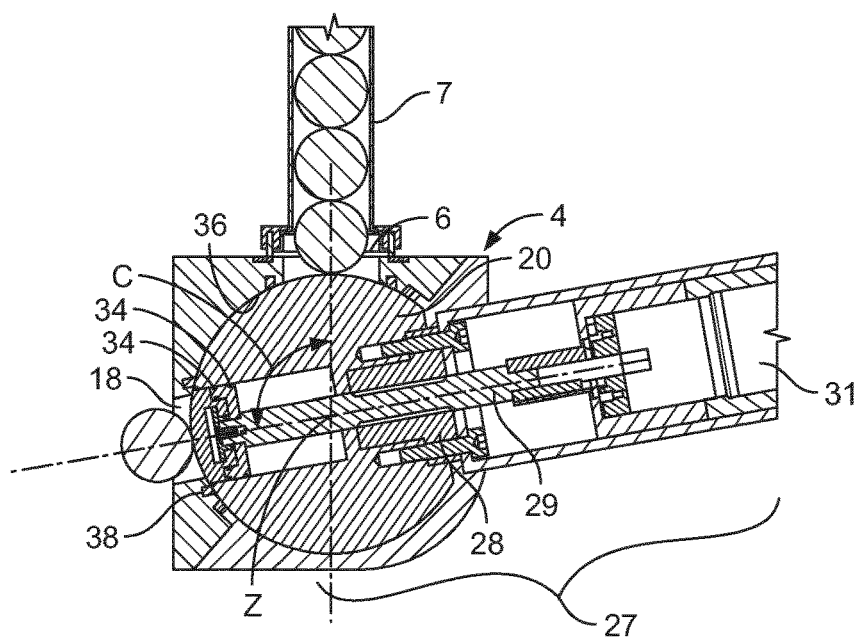
FIG. 27 shows a partial cross-sectional view of the portioned dispenser system of FIGS. 22 and 23 showing the interface between the exchangeable cartridge and the portion dispenser in the extended position of the moving means for dispensing to the dispensing area.

In this embodiment, the piston assembly 16 is arranged in a rotationally moveable in the frame 4 of the dispenser about an axis Z as shown in FIGS. 24 to 27. The piston assembly is moveable between the discharge position (FIG. 24) and the dispensing position of the beverage item (FIG. 27). The axis Z is substantially horizontal and perpendicular to the longitudinal axis I along which the piston moves between its extended and retracted positions.

The piston housing 20 may have a cylinder shape which rotates about a substantially horizontal axis, in a frame comprising a complementary cylindrical guiding cavity. In this case, the shutter 36 is formed by the cylindrical surface of the piston housing 20 as the discharge chamber 23 moves away from the discharge opening 6 and dispensing opening 18.

The dispensing opening 18 can be provided in the frame and be distant from the discharge opening by a certain angle C, for instance between 80 and 120°. However, the angle C can also be of another value provided it is sufficiently distant from the discharge opening to allow sufficient room for the piston assembly to be positioned beneath the cartridge.

The piston housing is sealed in the frame by sealing members 33, 38 positioned respectively around the discharge opening 6 and the dispensing opening 18.

Figure 22:
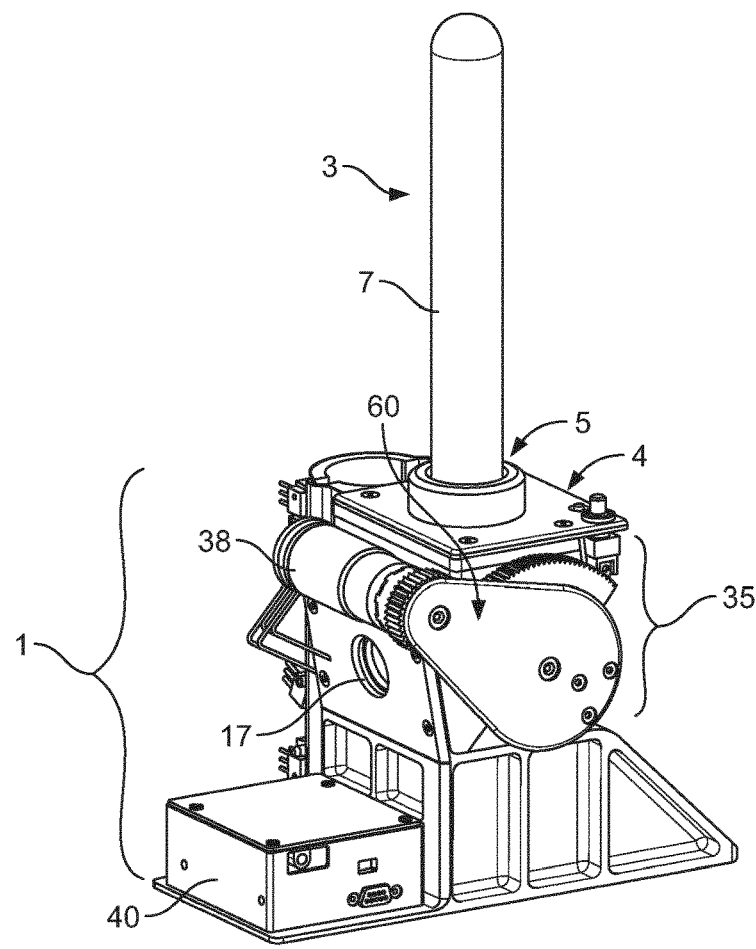
FIG. 22 is shows a perspective view of a second embodiment of the portioned dispenser system of the invention ("ball-valve type dispenser") with an exchangeable cartridge assembled with the portion dispenser.
Figure 23:
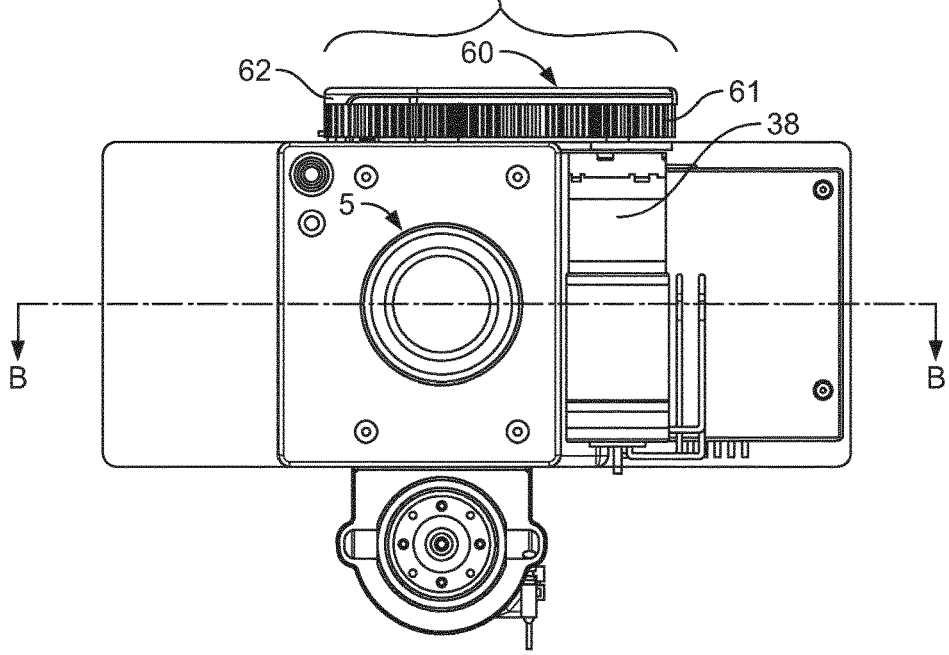
FIG. 23 is a top view of the portioned dispenser system of FIG. 22.
Figure 24:
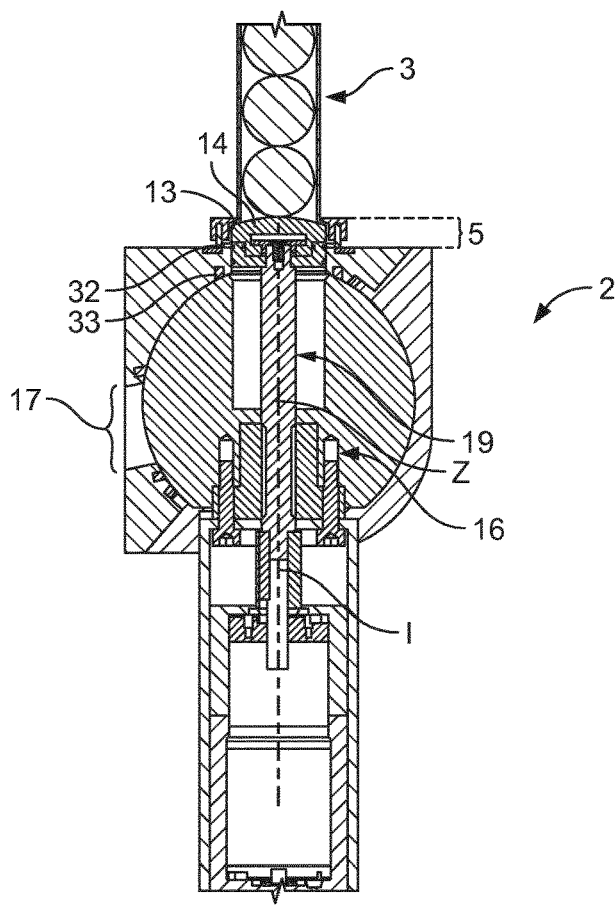
FIG. 24 shows a partial cross-sectional view of the portioned dispenser system of FIGS. 22 and 23 showing the interface between the exchangeable cartridge and the portion dispenser in the extended position of the moving means.
Figure 25:
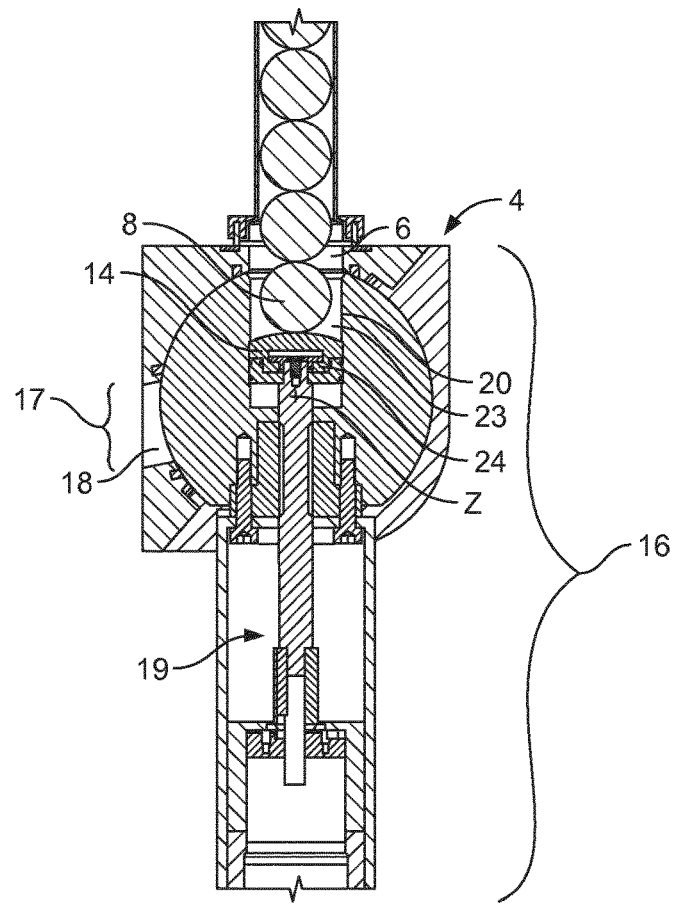
FIG. 25 shows a partial cross-sectional view of the portioned dispenser system of FIGS. 22 and 23 showing the interface between the exchangeable cartridge and the portion dispenser in the retracted position of the moving means and before transfer to the dispensing area.
Figure 26:
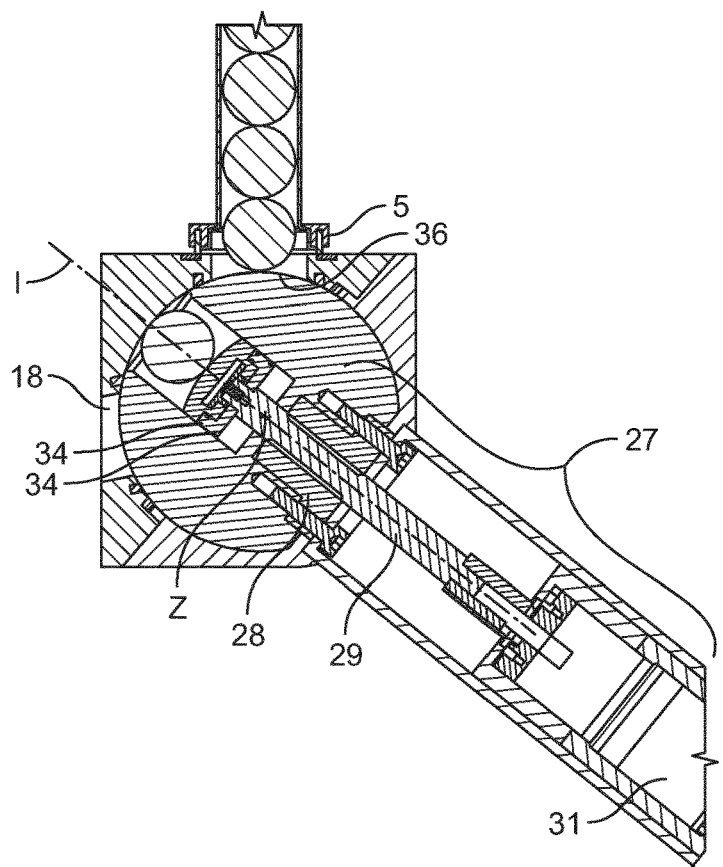
FIG. 26 shows a partial cross-sectional view of the portioned dispenser system of FIGS. 22 and 23 showing the interface between the exchangeable cartridge and the portion dispenser in the retracted position of the moving means and during transfer to the dispensing area.

The piston assembly actuator is represented in FIGS. 22 and 23 and comprises an electrical motor 38 driving a gear mechanism 60 which is connected to the piston assembly. The gear mechanism can comprise a pinion 61 linked to the motor's axle and geared with a arc-shaped rack 62 which is fixedly connected to a central axle of the cylindrical piston housing.

The portioned dispenser of the invention according to the two embodiments can be a part of the beverage preparation device comprising a brewing chamber which can receive the beverage item dispensed by the dispenser in the dispensing area.

It should also be noted that the portion dispenser can comprise several receiving portions arranged to enable the connection of several beverage items cartridges. The piston assembly could be further designed to move between different receiving portions for allowing the selective discharge of the beverage items and could also move from several receiving portions to one or more dispensing areas. The portion dispenser could also comprise one piston assembly per receiving portion.

The invention claimed is:

1. A portion dispenser system comprising a portion dispenser and at least one exchangeable cartridge, the portion dispenser configured for dispensing beverage items from the at least one exchangeable cartridge, the portion dispenser comprising:
    a frame with a receiving portion configured to receive the at least one exchangeable cartridge;
    a discharge opening next to the receiving portion and sized for allowing a beverage item to be individually discharged by gravity from the at least one exchangeable cartridge;
    a moving member assembly comprising a moving member and a moving member housing in which the moving member is configured to move therein;
    wherein the moving member is configured to provide a discharge chamber for discharge of the beverage item therein and to transport the beverage item to a dispensing area;
    wherein the moving member assembly is configured to connect with the at least one exchangeable cartridge, the moving member assembly comprising a member configured to open the at least one exchangeable cartridge to allow the discharge of the beverage item in the discharge chamber and configured to re-close the at least one exchangeable cartridge, wherein a closure cap is removably attached to a tubular storage member of the at least one exchangeable cartridge;
    wherein the moving member is axially or laterally arranged relative to the discharge opening and inside the moving member housing to move between an extended position in which the moving member comes at or next to the discharge opening to support the beverage item and a retracted position in which the discharge chamber is defined as a function of the retraction distance of the moving member relative to the discharge opening to receive the beverage item discharged from the at least one exchangeable cartridge; and
    wherein the moving member comprises a terminal portion configured to connect to the closure cap removably attached to the tubular storage member of the at least one exchangeable cartridge, and wherein the closure cap of the tubular storage member is configured to move with the terminal portion of the moving member between the retracted position and the extended position.

2. The portion dispenser system according to claim 1, wherein the at least one exchangeable cartridge comprises:
    the tubular storage member comprising an interior for accommodating a plurality of the beverage items, the tubular storage member comprising a closed end and an open end comprising an exit opening, wherein the tubular storage member comprises an attachment portion at or next to the exit opening and connectable to at least one tubular surface of the receiving portion; and
    the closure cap configured to connect to the tubular storage member at the open end of the tubular storage member in a removable and sealable manner through a removable complementary connection of the tubular storage member and the closure cap.

3. The portion dispenser system according to claim 2, wherein the closure cap of the at least one exchangeable cartridge comprises a locking member configured to complementarily fit with a keying member of the portion dispenser and to allow the closure cap to be removed from the tubular storage member and to be re-connected to the tubular storage member.

4. The portion dispenser system according to claim 1, wherein an interior of the at least one exchangeable cartridge is protected from an ambient environment by vacuum or inert gas, and wherein the tubular storage member and the closure cap are sealingly closed to prevent an exchange of gas and/or moisture with the ambient environment when the closure cap is in a sealed connected position with the tubular storage member.

5. The portion dispenser system according to claim 4, wherein the beverage items are spherical.

6. The portion dispenser system according to claim 5, wherein the beverage items are compacted balls of roast and ground coffee.

7. The portion dispenser system according to claim 1, wherein the moving member assembly is configured to sealingly connect with the at least one exchangeable cartridge.

8. The portion dispenser system according to claim 1, wherein the receiving portion comprises at least one tubular surface configured to couple with the at least one exchangeable cartridge in a substantially vertical or inclined arrangement of the at least one exchangeable cartridge to allow discharge of the beverage items by gravity.

9. The portion dispenser system according to claim 1, wherein the terminal portion of the moving member forms at least a part of the keying member configured to complementarily fit with the locking member of the closure cap configured to be removed from the tubular storage member of the exchangeable cartridge.

10. The portion dispenser system according to claim 1, wherein the moving member assembly is moveably mounted relative to the frame, the moving member assembly configured to move the discharge chamber between a discharge position in which the moving member is situated in axial relationship with the discharge opening and a dispensing position in which the moving member is situated in axial relationship with a dispensing opening of the frame.

11. The portion dispenser system according to claim 1, wherein the moving member assembly comprises a shutter configured to sealingly close the discharge opening as the moving member housing moves the moving member to the dispensing area.

12. The portion dispenser system according to claim 1, wherein the member comprises a moving member actuator configured to drive the moving member in a reciprocal axial path.

13. The portion dispenser system according to claim 1, wherein the moving member assembly is rotatably mounted to the frame.

14. The portion dispenser system according to claim 7 comprising a sealed connection between the moving member assembly and the at least one exchangeable cartridge, and the sealed connection is configured to limit or avoid significant ingress of ambient air at the connection during opening and re-closing of the exchangeable cartridge.

* * * * *